United States Patent [19]
Myerson et al.

[11] Patent Number: 5,851,490
[45] Date of Patent: Dec. 22, 1998

[54] METHOD FOR UTILIZING PH CONTROL IN THE RECOVERY OF METAL AND CHEMICAL VALUES FROM INDUSTRIAL WASTE STREAMS

[75] Inventors: Allan S. Myerson, Suffern, N.Y.; Micheal W. Cudahy, Jackson, Tenn.

[73] Assignee: Metals Recycling Technologies Corp., Atlanta, Ga.

[21] Appl. No.: 847,351

[22] Filed: Apr. 24, 1997

Related U.S. Application Data

[63] Continuation-in-part of Ser. No. 439,352, May 11, 1995, Pat. No. 5,759,503.

[51] Int. Cl.[6] ............................ C22B 13/00; C22B 17/00; C22B 19/00
[52] U.S. Cl. ............................ 423/97; 423/107; 423/109; 75/420; 75/724; 75/725; 75/961; 23/299
[58] Field of Search ............................ 423/97, 107, 109; 75/724, 725, 961, 420; 23/299

[56] References Cited

U.S. PATENT DOCUMENTS

| | | | |
|---|---|---|---|
| 1,023,964 | 4/1912 | Ranson | 423/109 |
| 2,105,394 | 1/1938 | Allavana | 423/622 |
| 2,898,191 | 8/1959 | Conn et al. | 423/622 |
| 3,515,510 | 6/1970 | Winter et al. | 23/55 |
| 3,743,501 | 7/1973 | Cusanelli et al. | 75/109 |
| 3,849,121 | 11/1974 | Burrows | 423/101 |
| 3,911,076 | 10/1975 | Probert et al. | 423/109 |
| 4,507,244 | 3/1985 | Von Rappard et al. | 23/299 |
| 4,606,765 | 8/1986 | Ferlay | 423/109 |
| 5,208,004 | 5/1993 | Myerson | 423/622 |
| 5,464,596 | 11/1995 | Myerson | 423/101 |
| 5,571,306 | 11/1996 | Myerson et al. | 75/724 |
| 5,582,631 | 12/1996 | Myerson et al. | 75/961 |
| 5,667,553 | 9/1997 | Keegel, Jr. | 75/961 |
| 5,683,488 | 11/1997 | Myerson et al. | 75/961 |

FOREIGN PATENT DOCUMENTS

| | | | |
|---|---|---|---|
| 467124 | 10/1975 | U.S.S.R. | 423/622 |
| 712450 | 1/1980 | U.S.S.R. | 423/622 |

*Primary Examiner*—Steven Bos
*Attorney, Agent, or Firm*—Deveau, Colton & Marquis

[57] ABSTRACT

An improved method for the recovery of metal and/or chemical values from an industrial waste stream containing zinc, cadmium, lead and/or iron compounds by heating the waste stream in a reducing atmosphere, treating the resultant fumes in an ammonium chloride solution, separating any undissolved components from the solution, adjusting the pH of the solution, if necessary, to less than about 6.3, displacing undesired metal ions from the solution using zinc metal, treating the solution to remove therefrom zinc compounds, adjusting the pH of the solution to about 6.5 to about 7.0, and further treating the zinc compounds and the undissolved components, as necessary, resulting in the zinc products and the optional iron-carbon feedstock.

27 Claims, No Drawings

METHOD FOR UTILIZING PH CONTROL IN THE RECOVERY OF METAL AND CHEMICAL VALUES FROM INDUSTRIAL WASTE STREAMS

STATEMENT OF RELATED APPLICATIONS

This application is a continuation-in-part of application Ser. No. 08/439,352 filed on May 11, 1995, now U.S. Pat. No. 5,759,503.

BACKGROUND OF THE INVENTION

1. Field of the Invention

The present invention relates generally to a process for the recovery of metal and chemical values including, for example, essentially pure zinc oxide and an ironcarbon residual, from industrial waste streams comprising zinc compounds and iron compounds. The present invention relates more specifically to controlling the pH in a process which subjects a waste materials stream comprising zinc compounds and/or iron compounds, such as electric arc furnace (EAF) dust, to a combination of reducing and leaching steps in a recycling operation which recycles process solutions for reuse, and recovers metal and/or chemical values.

2. Related Art

U.S. Pat. No. 3,849,121 to Burrows, now expired but which was assigned to a principal of the assignee of the present invention, discloses a method for the selective recovery of zinc oxide from industrial waste. The Burrows method comprises leaching a waste material with an ammonium chloride solution at elevated temperatures, separating iron from solution, treating the solution with zinc metal and cooling the solution to precipitate zinc oxide. The Burrows patent discloses a method to take EAF dust which is mainly a mixture of iron and zinc oxides and, in a series of steps, to separate out the iron oxides and other metals. However, the material obtained in the last step is a mixture of a small amount of zinc oxide, hydrated zinc phases which can include hydrates of zinc oxide and zinc hydroxide, as well as other phases, and a large amount of diamino zinc dichloride $Zn(NH_3)_2Cl_2$ or other similar compounds containing zinc and chlorine ions. Currently, the Burrows method is not economically viable because of Environmental Protection Agency guidelines established subsequent to the issuance of the Burrows patent. Additionally, the Burrows method is not a continuous method and, therefore, is not economical as a continuous process.

The first step in the Burrows patent is the treating of the EAF dust with an ammonium chloride solution. The action of the treatment is the leaching of zinc oxide, lead oxide and cadmium oxide in the solution without any leaching of the iron oxides present. Burrows does not teach the control of the solubility of zinc compounds in the ammonium chloride solution, other than by temperature variation. As a result, the Burrows method does not disclose or contemplate controlling solubility by controlling pH.

U.S. Pat. No. 4,071,357 to Peters discloses a method for recovering metal values which includes a steam distillation step and a calcining step to precipitate zinc carbonate and to convert the zinc carbonate to zinc oxide, respectively. Peters further discloses the use of a solution containing approximately equal amounts of ammonia and carbon to leach the flue dust at room temperature, resulting in the extraction of only about half of the zinc in the dust, almost 7% of the iron, less than 5% of the lead, and less than half of the cadmium. Steam distillation precipitates zinc carbonate, other carbonates and iron impurities. Steam distillation disadvantageously results in an increase in temperature which drives off ammonia and carbon dioxide, resulting in the precipitation of iron impurities and then zinc carbonate and other dissolved metals. Temperature lowering advantageously precipitates a number of crystalline zinc compounds. The purity of the zinc carbonate obtained depends on the rate of steam distillation and the efficiency of solids separation as a function of time. Peters does not disclose or contemplate controlling solubility by controlling pH to control the amount and effect of precipitation. In addition to the advantages of temperature lowering, the present process also employs steps to control the solubility of the product solution by the variation of the pH of the product solution.

Copending application Ser. No. 08/439,352, of which this application is a continuation-in-part, describes a method for the recovery of zinc products from industrial waste streams by treating the waste streams with carbon and an ammonium chloride solution and crystallizing the zinc products to remove them from the solution. However, the crystallization of zinc compounds can be unpredictable and difficult to control at times. For example, the solubility of the zinc compounds may vary depending upon the composition of the waste stream. Increased solubility renders it more difficult to crystallize the compounds in the crystallization step. On the other hand, decreased solubility may lead to premature crystallization of the compounds. Both problems reduce the operational efficiency and economic viability of the process.

Thus, there exists a need for a method of recovering metal and chemical values which provides for the enhanced control of the solubility of zinc compounds in an ammonium chloride solution. There also exists a need for an improved method of purifying zinc oxide which utilizes controlled precipitation of zinc oxide from an ammonium chloride solution. Further, this need also relates to processes for producing iron-based feedstocks from industrial waste streams.

BRIEF SUMMARY OF THE INVENTION

The present invention satisfies these needs in a method which recovers metal and/or chemical values from waste materials containing, inter alia, zinc or zinc oxide and/or iron or iron oxide, in which the solubility of certain zinc compounds is controlled through control of the pH of the product solution. Essentially pure zinc oxide can be recovered, along with zinc metal if desired, and values of other metallic elements contained in the waste material such as lead, copper, silver, and cadmium. The solutions used in the process are recycled such that the process does not have any liquid wastes. The solids recovered from the process, namely, the zinc oxide, zinc, metal values, and other residues all can be used in other processes. For example, some residue may be used directly as the feedstock for the typical iron or steel production process.

Briefly, the waste material, typically a fly ash, baghouse dust, or flue dust such as EAF dust, is heated and reduced to decompose franklinite to zinc oxide and to reduce any iron oxide present to direct reduced iron. The fumes from the heated waste material, which typically comprise the majority of the solids from the waste materials, then are leached with an ammonium chloride solution resulting in a product solution and undissolved materials. The product solution and the undissolved materials are separated, with both the product solution and the undissolved materials being further treated to recover valuable components. Zinc metal is added to the product solution to cement out any lead and cadmium contained in the product solution. The remaining product solution is rich in zinc compounds, which can be recovered via a crystallization step. The undissolved materials contain inerts and some alkali salts.

Waste material streams and the fumes from the heated waste material streams commonly contain chloride in the form of alkali chlorides (sodium and potassium), zinc chlorides, lead chlorides, and other complex metal salts. Leaching these waste material streams and/or fumes in an ammonium chloride solution may result in a product solution with a low pH (less than about 6.3). The lower pH renders the zinc compounds, namely, diamino zinc dichloride, more soluble at a given concentration and temperature, and, therefore, more difficult to crystallize in the crystallization step. If the pH is higher, on the other hand, the solubility of the zinc compounds at a given concentration and temperature is decreased, which may lead to premature crystallization of the zinc compounds.

Therefore, the solubility of zinc compounds at a given concentration and temperature can be controlled by monitoring and adjustment of the pH at various stages of the process. Preferably, the pH of the product solution is kept low by the addition of a suitable acid until the product solution reaches the crystallizer. This will prevent crystallization from occurring prematurely. Once the product solution reaches the crystallizer, a suitable base, such as ammonia, is added to decrease zinc compound solubility and facilitate crystallization.

The remaining product solution then can be treated in two manners. First, the remaining product solution can be cooled thereby precipitating the zinc components from the product solution as a mixture of crystallized zinc compounds. These crystallized zinc compounds are separated from the product solution, washed and then dried at elevated temperatures, resulting in a zinc oxide product of 99% or greater purity. Second, the remaining product solution can be subjected to electrolysis in which zinc metal plates onto the cathode of the electrolysis cell. Any remaining product solution after crystallization or electrolysis is recycled back to treat incoming waste material. Both of these processes can be carried out in a continuous manner.

Therefore, it is an object of the present invention is to provide a method for recovering zinc metal, zinc oxide, DRI, and/or iron oxide which is economical, quick and efficient.

It is another object of the present invention is to provide a zinc oxide purification process which utilizes controlled precipitation of zinc oxide out of an ammonium chloride solution.

These objects and other objects, features and advantages of the present invention will become apparent to one skilled in the art when the following Detailed Description of a Preferred Embodiment is read in conjunction with the attached FIGURES.

DETAILED DESCRIPTION OF A PREFERRED EMBODIMENT

The terminology used in this specification is for the purpose of describing particular embodiments only and is not intended to be limiting. As used in the specification and the appended claims, the singular forms "a," "an," and "the" include plural references unless the context clearly dictates otherwise. The "effective amount" of a compound as provided in this specification is meant to be a sufficient amount of the compound to provide the desired result. As will be pointed out below, the exact amount required will vary, depending on the composition of the waste stream and the compound employed. Thus, it is not always possible to specify an exact "effective amount." However, an appropriate effective amount may be determined by one of ordinary skill in the art using only routine experimentation. The term "suitable" is used to refer to a moiety which is compatible with the appropriate compounds for the stated purpose. Suitability for the stated purpose also may be determined by one of ordinary skill in the art using only routine experimentation.

The method for recovering metal and chemical values disclosed herein is carried out in its best mode in recovering these values from the waste streams of industrial or other processes. A typical industrial waste stream used is a flue dust where the charge contains galvanized steel, having the following percent composition:

TABLE I

Analysis of Flue Dust

| Component | Weight Percent |
|---|---|
| zinc oxide | 30.00 |
| iron oxide | 40.00 |
| lead oxide and lead chloride | 6.48 |
| inert materials[1] | 9.10 |
| sodium oxide and sodium chloride | 5.00 |
| calcium oxide | 2.80 |
| potassium oxide and potassium chloride | 3.00 |
| manganese oxide | 1.29 |
| tin oxide | 1.13 |
| aluminum oxide | 0.38 |
| magnesium oxide | 0.33 |
| chromium oxide | 0.16 |
| copper oxide | 0.06 |
| silver | 0.05 |
| unidentified materials[2] | 0.22 |

Generally, the present process is an improved continuous method for the recovery of metal and/or chemical values from waste material streams which comprise zinc and iron compounds, siliceous material and salts comprising the steps of:

a. heating the waste material at an elevated temperature and in a reducing atmosphere;

b. treating the fumes from the heating step with an ammonium chloride solution at an elevated temperature to form a product solution which comprises dissolved zinc compounds, and an undissolved material which comprises siliceous material salts, and, depending on the feed composition, small amounts of iron compounds;

c. separating the product solution from the undissolved materials;

d. determining the pH of the product solution and if the pH of the product solution is above 6.3 then adding an effective amount of a suitable compound to the product solution to obtain a pH of less than about 6.3;

e. adding zinc metal to the product solution whereby any lead and cadmium ions contained within the product solution are displaced by the zinc metal and precipitate out of the product solution as lead and cadmium metals;

f. separating the product solution from the lead and cadmium metals;

g. adding an effective amount of a suitable compound to the product solution to obtain a pH of about 6.5 to about 7.0;

h. lowering the temperature of the product solution thereby precipitating the zinc component as a mixture of crystallized zinc compounds; and i. separating the precipitated zinc compounds from the product solution.

The precipitated zinc compounds can be further treated to produce one or more high purity zinc-based products. The undissolved materials can be used as is or further treated to be used for the feedstock to iron and/or steel making processes. The remaining product solution also can be further treated to recover additional metal and/or chemical values.

The initial leaching step can be performed either on fumes produced by the reducing step or on raw dust. One skilled in the art will recognize that various reduce-leach-reduce or leach-reduce-leach combinations are compatible with this method, as described in related applications. A two-stage leaching process will provide greater yields of zinc oxide, and a two-stage heating (reducing) process will provide greater yields of iron-based feedstocks.

An ammonium chloride solution in water is prepared in known quantities and concentrations. If the two-stage leaching process is used (leach-reduce-leach), the feed material, such as the waste material flue dust described in Table I or any other feed material source which contains zinc, zinc oxide, iron and/or iron oxide mixed with other metals, is added to the ammonium chloride solution at a temperature of about 90° C. or above. Otherwise, the feed material first is reduced by heating the feed material in a reducing atmosphere. The iron oxide is reduced to ferrous oxide (FeO) in the reducing step to ensure no iron solubility. The zinc and/or zinc oxide dissolves in the ammonium chloride solution along with other metal oxides, such as lead oxide and cadmium oxide. The ferrous oxide and the remaining iron oxide does not dissolve in the ammonium chloride solution. The solubility of zinc oxide in ammonium chloride solutions is shown in Table II.

TABLE III

Solubility of ZnO in 23% $NH_4Cl$ solution

| Temperature °C. | g Dissolved/100 g $H_2O$ |
|---|---|
| 90 | 14.6 |
| 80 | 13.3 |
| 70 | 8.4 |
| 60 | 5.0 |
| 50 | 3.7 |
| 40 | 2.3 |

An 18%–23% by weight ammonium chloride solution in water at a temperature of at least 90° C. provides the best solubility of zinc oxide, with a 23% by weight ammonium chloride solution being the most preferred. Concentrations of ammonium chloride below about 23% do not dissolve the maximum amount of zinc oxide from the flue dust, and concentrations of ammonium chloride above about 23% tend to precipitate out ammonium chloride along with the zinc oxide when the solution is cooled. Iron oxide and inert materials such as silicates will not dissolve in the preferred solution.

At least a portion of the zinc oxide, as well as smaller concentrations of lead or cadmium oxide, may be removed from the initial dust by the dissolution in the ammonium chloride solution in a first leaching step. The solid remaining after this leaching step contains zinc, iron, lead and cadmium, and possibly some other impurities. The remaining solid then is heated in a reducing atmosphere, typically at a temperature greater than 420° C. and often at 700° C. to 900° C. Preferably, the feed material is first heated in a reducing atmosphere, at the previously mentioned temperature. The reducing atmosphere can be created by using hydrogen gas, simple carbon species gases such as carbon dioxide, or by heating the material in an oxygen containing gas in the presence of elemental carbon. The carbon preferably is in the form of dust or pellets. Typical heating times are from 30 minutes to 4 hours.

The typical feed dust contains from 15%–30% zinc by weight. X-ray diffraction indicates the existence of certain crystalline phases in this dust, specifically zinc oxide. The positive identification of the iron phase is complicated by the possible structural types (i.e. spinel type iron phases showing almost identical diffraction patterns). The combination of chemical analysis and x-ray diffraction indicates that the feed dusts typically comprise a combination of magnetite (iron oxide: $Fe_3O_4$). Both of these phases have very similar spinel type structures. The zinc within the franklinite, $(Fe, Mn, Zn)(FeMn)_2O_4$, cannot be removed by dissolution with ammonium chloride. In addition, no simple extraction process will remove zinc from this stable oxide phase. Although franklinite is very stable to oxidation (all elements in the highest oxidation state), it is relatively easy to destroy this compound by reduction at elevated temperatures.

The reducing step can be carried out prior to the initial leaching step, or between a first and second leaching step. The waste dust is heated to temperatures greater than 500° C. This temperature causes a reaction which causes a decomposition of the stable franklinite phase into zinc oxide and other components, and yet does not allow for the complete reduction of zinc oxide to zinc metal. The resulting zinc oxide can be removed by sublimation or extraction with an ammonium chloride solution, such as by following the steps detailed above under the general process. The resulting material after extraction has less than 1% by weight zinc. Further, when heated in a reducing atmosphere, iron oxide will be reduced to form direct reduced iron.

The dust can be reduced using many conventional reduction processes, such as, for example, direct or indirect heating and the passing of hot gases through the dust. For example, non-explosive mixtures of reducing gases, such as for example hydrogen gas and nitrogen or carbon dioxide, can be passed through the dust. Hydrogen gas is not the only species that may be used for reductive decomposition of franklinite and the reduction of iron oxide. It is possible to use carbon or simple carbon containing species, including carbon-containing reducing gases and elemental carbon. Heterogeneous gas phase reductions are faster than solid state reductions at lower temperatures and therefore suggest the use of carbon monoxide. The carbon monoxide can be generated in situ by mixing the franklinite powder with carbon and heating in the presence of oxygen at elevated temperatures. The oxygen concentration is controlled to optimize CO production. The carbon monoxide may be introduced as a separate source to more clearly separate the rate of carbon monoxide preparation from the rate of Franklinite decomposition. The prepared zinc oxide then can be removed by either ammonium chloride extraction or sublimation.

The reduction process also can be performed to complete reduction by using carbon at high temperatures and collecting zinc metal that will melt at very low temperatures (420° C.) and boil at 907° C. In this process, zinc metal is obtained that, if desired, can be converted readily to the oxide by air roasting.

After the dust has been reduced by heating in a reducing atmosphere, the fumes created by the heating step typically comprise the majority of the solids from the dust and are subjected to a leaching step in the 18%–23% ammonium chloride solution in water at a temperature of at least 90° C. Any zinc or zinc oxide formed during the reducing step dissolves in the ammonium chloride solution. The zinc oxide and ammonium chloride solution then is filtered to remove any undissolved material, including the iron oxide.

Because the temperature at which zinc compounds (specifically, for example, diamino zinc chloride) will crystallize at a given zinc concentration decreases with pH, the pH of the product solution is kept below about 6.3 prior to reaching the crystallizer. The lower pH will prevent premature crystallization of the zinc compounds. Premature crystallization reduces the zinc recovery rate and may clog transfer lines or other parts of the recovery apparatus. The pH can be determined either through knowledge of the composition of the waste material stream, by direct measurement, or by other known methods. As stated above, the product solution pH often will be low due to chlorides present in the waste material stream. However, if it is necessary to further reduce the pH of the product solution, one skilled in the art will recognize suitable compounds to add to the product solution in an effective amount to reduce the pH. The presently preferred compound is hydrochloric acid (HCl).

For example, zinc rich fume dust from a rotary hearth furnace has a typical approximate composition of:

| | |
|---|---|
| 70% | ZnO |
| 6% | Pb |
| 3% | Na |
| 3% | K |
| 11% | Cl |
| 3% | Insoluble |
| 4% | Other |

When this dust is leached with 20% ammonium chloride solution, the resulting product solution will have a pH of 5.9–6.3. This product solution will not prematurely crystallize prior to the crystallizer due to its lower pH, and thus needs no pH adjustment. However, as discussed below, an upward pH adjustment will be necessary at the crystallizer.

While one skilled in the art will recognize that the pH of the product solution may be adjusted at various stages of the process, care should be taken in doing so before the undissolved materials including iron oxide are removed. If the pH is strongly acidic at this point, the iron oxide may dissolve into the solution. It is preferable to keep the iron oxide, and any other iron compounds, out of solution for ease of recovery and use in other processes.

To recover the zinc oxide, while the filtered zinc oxide and ammonium chloride solution is still hot, that is at a temperature of 90° C. or above, finely powdered zinc metal is added to the solution. Through an electrochemical reaction, any lead metal and cadmium in solution plates out onto the surfaces of the zinc metal particles. The addition of sufficient powdered zinc metal results in the removal of virtually all of the lead of the solution. The solution then is filtered to remove the solid lead, copper, zinc and cadmium.

Powdered zinc metal alone may be added to the zinc oxide and ammonium chloride solution in order to remove the solid lead and cadmium. However, the zinc powder typically aggregates to form large clumps in the solution which sink to the bottom of the vessel. Rapid agitation typically will not prevent this aggregation from occurring; however, mixing with high shear forces may. To keep the zinc powder suspended in the zinc oxide and ammonium chloride solution, any one of a number of water soluble polymers which act as antiflocculants or dispersants also may be used. In addition, a number of surface active materials also will act to keep the zinc powder suspended, as will many compounds used in scale control. These materials only need be present in concentrations of 10–1000 ppm. Various suitable materials include water soluble polymer dispersants, scale controllers, and surfactants, such as lignosulfonates, polyphosphates, polyacrylates, polymethacrylates, maleic anhydride copolymers, polymaleic anhydride, phosphate esters and phosponates. A discussion of these various materials can be found in the literature, such as Drew, Principles of Industrial Waste Treatment, pages 79–84, which is incorporated herein by reference. Flocon 100 and other members of the Flocon series of maleic-based acrylic oligomers of various molecular weights of water soluble polymers, produced by FMC Corporation, also are effective. Adding the dispersants to a very high ionic strength solution containing a wide variety of ionic species is anathema to standard practice as dispersants often are not soluble in such high ionic strength solutions.

At this stage there is a filtrate rich in zinc compounds and a precipitate of lead, cadmium and other products. The filtrate and precipitate are separated, with the precipitate being further treated, if desired, to capture chemical values. The filtrate may be treated in several manners, two of which are preferred. First, the filtrate may be cooled resulting in the crystallization and recovery of zinc oxide. Second, the filtrate may be subjected to electrolysis resulting in the generation and recovery of metallic zinc.

To facilitate crystallization, the product solution pH is raised to about 6.5 to about 7.0 immediately prior to crystallization. Increasing the pH of the product solution reduces the solubility of the zinc compounds at a given concentration and temperature, and thereby increases crystallization. One skilled in the art will recognize suitable compounds to add to the product solution in an effective amount to increase the pH. The presently preferred compounds are ammonium hydroxide and ammonia. Addition of these compounds results in the formation of additional ammonium chloride which increases the pH.

The filtrate can then be treated to crystallize out diamino zinc dichloride and other complex compounds. This can be done in either a batch or continuous crystallizer by cooling the filtrate to between 20° C. and 60° C. The crystallized diamino zinc dichloride then is added to 25° C. to 100° C. water to decompose it into zinc oxide and ammonium chloride. The amount and temperature of the water controls the decomposition of the diamino salt to zinc oxide and thus, influences particle size and chloride content as described in related applications. The solid hydrated zinc oxide species are filtered from the solution and dried at a temperature of 100° C.–350° C. for 5 seconds to 5 minutes.

As the zinc, lead and cadmium contained in the feed materials are amphoteric species, by using ammonium chloride solution these species will go into solution, while any iron oxide present in the feed material will not go into solution. Other solutions, such as strong basic solutions having a pH greater than about 10 or strong acidic solutions having a pH less than about 3, also can be used to dissolve the zinc, lead and cadmium species; however, if strong acidic solutions are used, iron oxide will dissolve into the solution, and if strong basic solutions are used, iron oxide will become gelatinous. The lead and cadmium can be removed from the ammonium chloride solution through an electrochemical reaction which results in the precipitation of lead and cadmium in elemental form.

The difference in solubility between diamino zinc dichloride and zinc oxide in water and in ammonium chloride solutions allows the selective dissolution of the diamino zinc dichloride such that pure zinc oxide can be recovered. This also can be used in the crystallization step to improve the relative amounts of diamino zinc dichloride and zinc oxide species form. Significantly, all of the zinc can be recycled so that all of the zinc eventually will be converted into zinc oxide. The crystallization step can be done continuously in order to increase the throughput and maximize the zinc oxide yield after the washing and drying step.

During the crystallization step, it is preferable to use a reverse natural cooling profile. Such a profile is the opposite shape as that which is observed by natural cooling. In a reverse natural cooling profile, the cooling is slower at the beginning and faster at the end; in a natural cooling profile, the cooling is faster at the beginning and slower at the end. Controlling the temperature with a reverse natural cooling curve results in a larger average crystal size than by linear cooling or natural cooling which improves the filtration rate.

To produce pure zinc oxide from waste dust containing zinc efficiently and in a safe and cost effective way, the process recycles all zinc which is not removed from the leachate in the crystallization step. In addition, the diamino zinc dichloride and ammonium chloride which is redissolved in water in the washing step also is recycled. The recycle of zinc increases the overall zinc concentration in liquid solution in the process. This allows the crystallizer to operate at a higher temperature due to the rapid change in zinc oxide solubility with temperature in ammonium chloride solution.

The recycle has the advantage in that the solution may become saturated relative to certain materials present in the dust, such as CaO. When this occurs, CaO no longer is leached from the dust but remains with the iron. This increases the value since CaO is still present and will not have to be added when the iron cake is fed to a furnace in steel making. Another important advantage in that there is no liquid effluent in this process. The only products are solid (iron cake, zinc oxide, and other metals), which are then sold for use in various industrial processes. No waste is produced since all liquid is recycled.

The process also can be operated to produce a high-quality iron-carbon cake as a residual product. The iron oxide contained in the waste stream does not go into solution in the ammonium chloride solution, but is filtered from the product solution as undissolved material. This iron oxide cake can be used as is as the feedstock to a steel mill; however, it becomes more valuable if reduced by reaction with elemental carbon to produce an iron-carbon or direct-reduced iron product. One preferred method for producing such an iron-carbon or direct-reduced iron product from the waste material is to add carbon to the product solution whereby the carbon will not go into solution, and then separate the product solution from any undissolved materials present in the product solution including any of the iron oxide and the carbon. Combining carbon and iron oxide results in the reduction of the iron oxide, producing direct-reduced iron (DRI). Generally the iron oxide and carbon product is pressed into a cake for ease of handling and use.

The reducing process produces vapors, from the zinc, lead and cadmium and other impurities, that have to be condensed into dust. These impurities can be sent to the baghouse at the end of the steel making process, mixed into the original waste dust, and then sent to the first leaching step, in a recycle fashion. Alternatively, the exhaust vapors and dust from the reducing step may be sent to a separate baghouse at a stand alone facility.

The fumes exhausting from the steel mill furnace and the reduction furnace typically are iron poor, but comprise other valuable components. The furnace exhaust fumes are an excellent source of iron poor waste materials useful for recovery in the present process. The exhaust fumes may be filtered in a baghouse, with the resulting filtrate being added to the waste stream feed of the present process, or with the resulting filtrate being the primary waste stream feed of the present process. The exhaust fumes also may be scrubbed in a wet scrubber, with the resulting loaded scrubbing solution being added to the ammonium chloride leachant of the present process. If an ammonium chloride scrubbing solution is used instead of water, the loaded ammonium chloride scrubbing solution may be used as the primary leachant of the present process.

The process also can be operated to recover zinc metal by replacing the crystallization steps with an electrolysis step. One preferred method for the recovery of zinc oxide from waste material streams which comprise zinc compounds using electrolysis comprises subjecting the final product solution to electrolysis to extract zinc metal from said combined product solution. The product solution from the leaching steps comprises zinc ions in solution as $Zn^{2+}$. When the product solution is subjected to electrolysis in an electrolytic cell containing an anode and a cathode, the zinc metal is electrodeposited on the cathode. Although it is preferable to have the cathode made from zinc metal, cathodes of other material also will allow the electrodeposition of zinc metal from the combined product solution. Any of the electrolysis cells discussed in the literature are suitable, as long as such cells are configured for the electrolysis of zinc ion containing solutions.

The product solution also contains sodium, potassium, magnesium, calcium, and other solubles in solution. These solubles can be recovered by introducing an electrolyte either in the leaching step or in the ammonium chloride storage tanks receiving the recycled product solution. As ammonium chloride is used as the leachant, ammonium salts in solution is the preferred electrolyte. For example, if some ammonium sulfate is added, one could precipitate out calcium sulfate. Ammonium sulfate is a preferred electrolyte to add because the process already uses ammonium in the form of ammonium chloride. The preferred electrolytes include ammonium sulfate, ammonium hydroxide, or ammonium carbonate to precipitate out various solubles.

The above description sets forth the best mode of the invention as known to the inventor at this time, as it is obvious to one skilled in the art to make modifications to this process without departing from the spirit and scope of the invention and its equivalents as set forth in the appended claims.

What is claimed is:

1. A method for the recovery of metal and/or chemical values from waste material streams which comprise zinc compounds, comprising the steps of:

a. heating said waste material at an elevated temperature and in a reducing atmosphere, thereby producing exhaust fumes comprising zinc, lead, and cadmium compounds;

b. treating said exhaust fumes with an ammonium chloride solution at an elevated temperature to form a first product solution which comprises dissolved zinc compounds, and a first undissolved material;

c. determining the pH of said first product solution and if the pH of said first product solution is greater than 6.3 then adding an effective amount of a first compound to said first product solution to obtain a pH of less than about 6.3;

d. adding zinc metal to said first product solution whereby any lead and cadmium ions contained within said first product solution are displaced by said zinc metal and precipitate out of said first product solution as lead and cadmium metals, leaving a second product solution;

e. adding an effective amount of a second compound to said second product solution to obtain a pH of about 6.5 to about 7.0; and f. lowering the temperature of said second product solution thereby precipitating the zinc compounds as a mixture of crystallized zinc compounds, leaving a third product solution.

2. The method as described in claim 1, wherein said first compound in step c is selected from the group consisting of hydrochloric acid and sulfuric acid.

3. The method as described in claim 2, wherein said second compound in step e is selected from the group consisting of ammonium hydroxide and ammonia.

4. The method as described in claim 3, wherein said first product solution of step d is maintained at a temperature of at least 90° C.

5. The method as described in claim 4, wherein the concentration of said ammonium chloride solution in step b is 18–23% by weight ammonium chloride.

6. The method as described in claim 5, wherein said waste materials are heated at a temperature of at least 500° C.

7. The method as described in claim 1, wherein said first product solution is separated from said first undissolved materials prior to determining the pH of said first product solution.

8. The method as described in claim 1, wherein said second product solution is separated from the lead and cadmium metals prior to adding said second suitable compound to said second product solution.

9. The method as described in claim 3, wherein said zinc metal is in powdered form.

10. The method as described in claim 3, wherein the temperature of said second product solution is lowered in step f to between about 20° C. and about 60° C. using a reverse natural cooling profile to precipitate the zinc component therefrom.

11. The method as described in claim 1, wherein crystallization step f is carried out continuously.

12. The method as described in claim 1, wherein said reducing atmosphere comprises carbon.

13. The method as described in claim 1, further comprising the steps of:

g. washing said precipitated zinc compounds with a wash water thereby solubilizing certain of said zinc compounds into a zinc compound containing solution; and then h. drying said remaining zinc compounds solids at a temperature of at least 100° C. whereby said resulting product is zinc oxide of 99% or greater purity.

14. The method as described in claim 13, wherein said precipitated zinc compounds are separated from said third product solution prior to washing said precipitated zinc compounds.

15. The method as described in claim 13, wherein the remaining zinc compounds solids are separated from said zinc compound containing solution prior to drying said remaining zinc compounds.

16. The method as described in claim 13, wherein during said step of drying said remaining zinc compounds solids, said remaining zinc compounds solids are dried at a temperature of between 100° C. and 350° C.

17. The method as described in claim 1, further comprising the steps of pretreating said waste material a first time with an ammonium chloride solution at an elevated temperature to form an initial product solution which comprises dissolved zinc compounds and an initial undissolved materials separating said initial product solution from said initial materials, and subjecting said initial undissolved materials to steps a through f of claim 1, and said initial product solution to steps c through f of claim 1.

18. A method for the recovery of metal and/or chemical values from waste material streams which comprise zinc, cadmium, and lead compounds, comprising the steps of:

a. treating said waste material stream with an ammonium chloride solution at an elevated temperature to form a first product solution which comprises dissolved zinc, cadmium, and lead compounds, and a first undissolved material;

b. separating said first product solution from said first undissolved materials;

c. determining the pH of said first product solution and if the pH of said first product solution is greater than 6.3 then adding an effective amount of a first compound to said first product solution to obtain a pH of less than about 6.3;

d. adding zinc metal to said first product solution whereby any lead and cadmium ions contained within said first product solution are displaced by said zinc metal and precipitate out of said first product solution as lead and cadmium metals, leaving a second product solution;

e. separating said second product solution from the lead and cadmium metals;

f. adding an effective amount of a second compound to said second product solution to obtain a pH of about 6.5 to about 7.0; and g. lowering the temperature of said second product solution thereby precipitating the zinc compounds as a mixture of crystallized zinc compounds, leaving a third product solution.

19. The method as described in claim 18, wherein said first compound in step c is selected from the group consisting of hydrochloric acid and sulfuric acid.

20. The method as described in claim 19, wherein said second compound in step f is selected from the group consisting of ammonium hydroxide and ammonia.

21. The method as described in claim 20, wherein said first product solution of step d is maintained at a temperature of at least 90° C.

22. The method as described in claim 21, wherein the concentration of said ammonium chloride solution in step a is 18–23% by weight ammonium chloride.

23. The method as described in claim 20, wherein said zinc metal is in powdered form.

24. The method as described in claim 20, wherein the temperature of said second product solution is lowered in step g to between about 20° C. and about 60° C. using a reverse natural cooling profile to precipitate the zinc component therefrom.

25. The method as described in claim 19, wherein crystallization step h is carried out continuously.

26. The method as described in claim 18, further comprising the steps of:

h. separating said precipitated zinc compounds from said third product solution;

i. washing said zinc compounds solids with a wash water thereby solubilizing certain of said zinc compounds into a zinc compound containing solution;

j. separating the remaining zinc compounds solids from said zinc compound containing solution; and then k. drying said remaining zinc compounds solids at a temperature of at least 100° C. whereby said resulting product is zinc oxide of 99% or greater purity.

27. The method as described in claim 26, wherein during said step of drying said remaining zinc compounds solids, said remaining zinc compounds solids are dried at a temperature of between 100° C. and 350° C.

* * * * *